Oct. 9, 1956
H. T. KRAFT
2,766,006
DIAPHRAGM BEAD SPREADER
Filed June 22, 1955
2 Sheets-Sheet 1
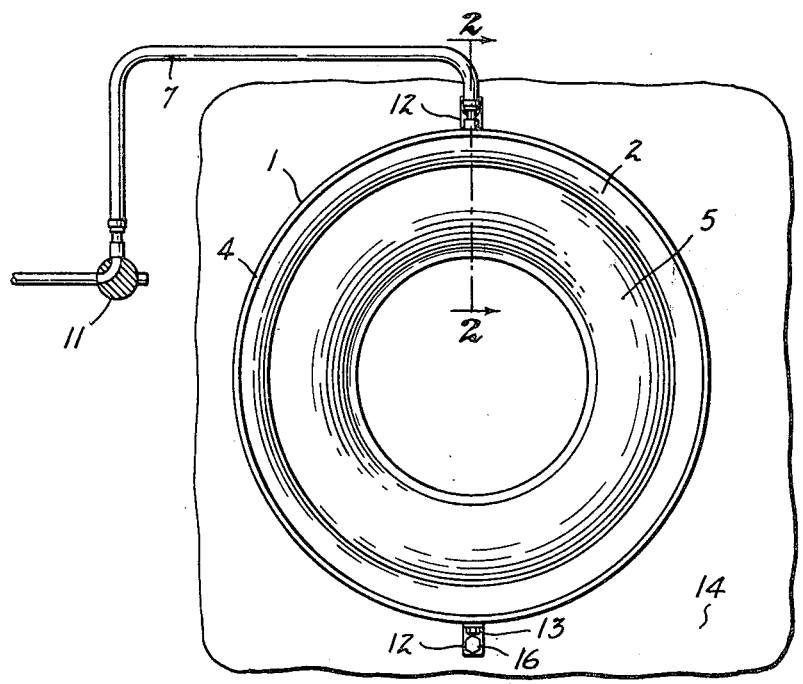
Fig. 1
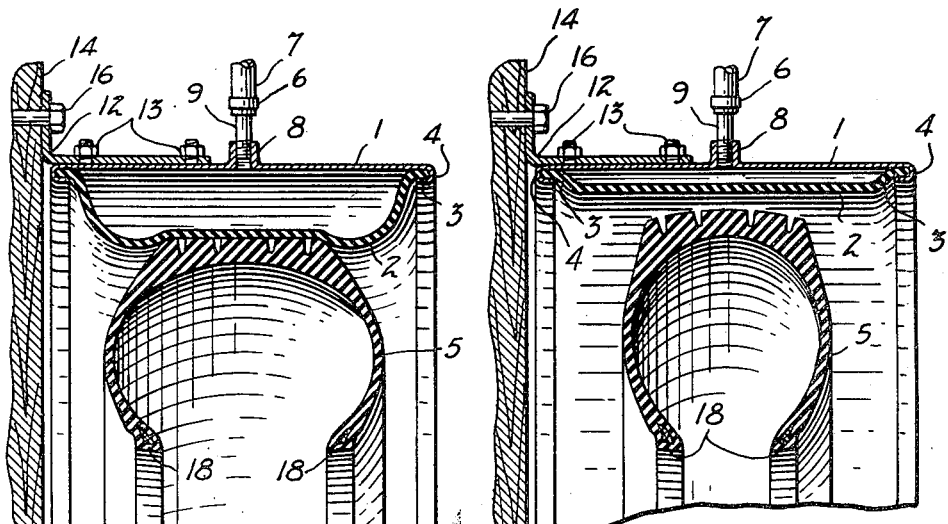
Fig. 2
Fig. 3
INVENTOR
*Herman T. Kraft*
BY McCoy, Greene & DeGrotenhuis
ATTORNEYS Oct. 9, 1956

H. T. KRAFT 2,766,006

DIAPHRAGM BEAD SPREADER

Filed June 22, 1955

INVENTOR
*Herman T. Kraft*

BY *McCoy, Greene & TeGrotenhuis*
ATTORNEYS

2,766,006
DIAPHRAGM BEAD SPREADER

Herman T. Kraft, Akron, Ohio, assignor to The General Tire & Rubber Company, Akron, Ohio, a corporation of Ohio Application June 22, 1955, Serial No. 517,281

8 Claims. (Cl. 254—50.3)

The subject invention relates to a pneumatic spreader for opening and spreading annular casings such as pneumatic tires, air bags, and the like so as to provide clear access to the interior portions thereof. In particular, this invention relates to a ring with a diameter slightly larger than the casing to be opened, a flexible membrane mounted on the inner surface of said ring, and means to inflate and deflate said membrane.

As larger pneumatic tires have been developed, it has become more difficult to open said tires and spread the beads apart for insertion of the inner tube. Likewise, air bag casings have increased in size and it has become more difficult to insert and remove the air bags from them. The usual methods employed were ones using tools such as pries and pullers operated by hand. The large size of the present annular casings, however, make hand operations very difficult and laborious. Hand operations, moreover, with the necessary pulling and prying tend to damage the casings and reduce their period of use.

Furthermore, it is often necessary to insert into the casings puncture proof inner tubes which are in a half-inflated condition to prevent opposite tube walls from sticking together. Thus complete access to the interior of the tire casing is often necessary and any article across the tire beads interferes with this access. This is most difficult to effect with available pries and pullers.

It is thus one object of the present invention to provide mechanical means for opening and spreading annular casings.

It is another object of the present invention to provide a means for opening and spreading annular casings so that clear and easy access to the interior of the casing is provided.

Other objects and advantages of this invention will become apparent from the following description and accompanying drawings in which:

Figure 1 is an elevation view of the spreader of the subject invention mounted on a wall showing a tire disposed in the core of the spreader and the membrane inflated;

Fig. 2 is a cross-sectional view taken along line 2—2 of Fig. 1 showing the membrane inflated and the tire beads spread apart and open;

Fig. 3 is a cross-sectional view similar to Fig. 2 except that the membrane is deflated and the tire beads are in their normal position;

Figure 4:
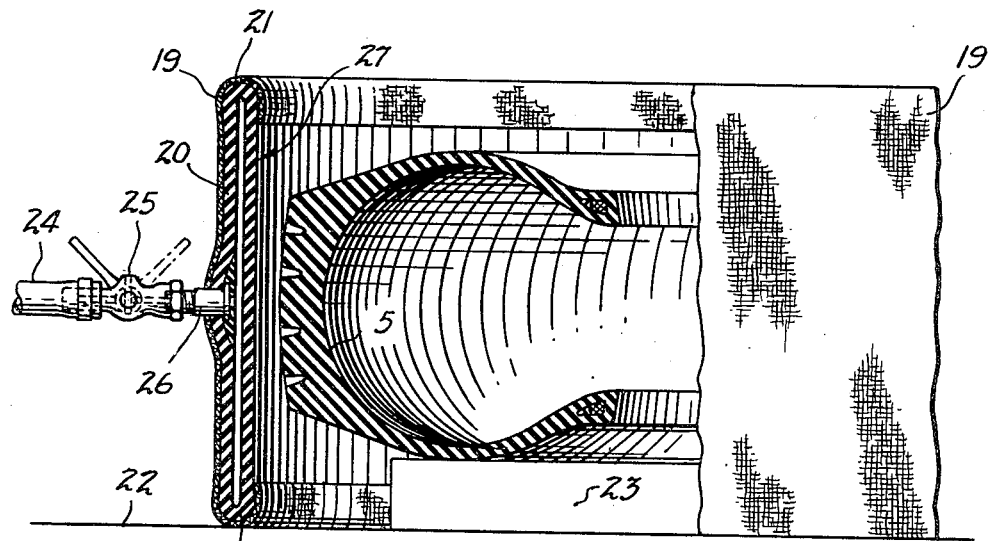
Fig. 4 is a view partially in cross-section of another form of spreader of the subject invention mounted horizontally on the floor or ground support with a tire disposed in the core of the spreader and the membrane deflated.

The subject invention is directed toward providing a means of opening and spreading pneumatic tire casings, air bag casings, and similar relatively stiff annular casings with an opening or split at the inner diameter thereof.

The invention features a ring or cylinder 1 with a diameter slightly larger than the diameter of the annular casing 5 to be opened. The ring is preferably made of steel or other relatively inexpensive, strong metal. The width of the ring is preferably from one-half to three times the width of the annular casings to be opened and the diameter of the ring is preferably from around one-half to two or more inches greater than the diameter of the annular casings to be opened. There must of course be sufficient clearance between the casing and the ring can be rotatably mounted and an interior light source provided to facilitate handling and inspection. The inner circumference of the membrane defines a central core portion free of all incumbrances and this core portion is adapted to freely receive pneumatic tires and other annular casings.

Mounted on the ring is a rubber, plastic, or air-tight fabric membrane 2. The membrane or sheet is preferably of rubber but can be of plastic sheet, air-tight rubber or plastic impregnated fabric, or other flexible, air-tight sheet material. The edges 3 of the membrane are clamped and cemented to the ring to provide an air-tight seal. For this purpose, the ring is provided with edge channel-shaped portions 4 into which the edges 3 of the membrane are disposed. The channels are then clamped and pinched against the membrane edges and an air-tight seal is achieved. The membrane edges 3 can also be cemented into the channels 4 on the ring. Other means of providing an air-tight seal between the edges of the membrane and the ring are equally serviceable such as lapping the edges of the membrane over the edges of the ring and then binding the membrane edges to the ring with multiple turns of wire.

Air is supplied to the annular cavity thus formed between the membrane and inner surface of the ring through an air supply means comprising a pipe tap boss 8 welded onto the ring, a pipe 9 screwed into the pipe tap boss 8, and a hose 7 clamped to the pipe 9 by clamp 6.

Air is supplied through hose 7 to inflate the membrane or diaphragm and is also exhausted through the hose to deflate the membrane. The air pressure is controlled through a three-way valve 11 or through other suitable control means, which provides an inlet, exhaust, and shut-off. The air supply means can also be located on the membrane if desired.

For convenience of the operator, the ring can be attached to the wall by brackets 12 which are attached to the ring by bolts 13. The brackets are in turn bolted to the wall 14 by bolts 16. The operator can thus set the annular casing in the spreader at breast-height and can conveniently work on it and examine it.

The spreader operates as follows:

The annular casing 5, in this case a pneumatic tire casing, is placed inside the ring or in the core of the ring and the membrane is inflated. The membrane presses in on the circumference of the casing. As the pressure in the membrane is increased, the tread face is flattened and the side walls bulge. The beads 18 diverge and spread and the tire is open. This is shown in Fig. 2. Since the tire beads are substantially non-collapsible wire hoops, they do not collapse under the pressure of the inflated diaphram around the tread circumference and instead spread and laterally diverge.

Figure 5:
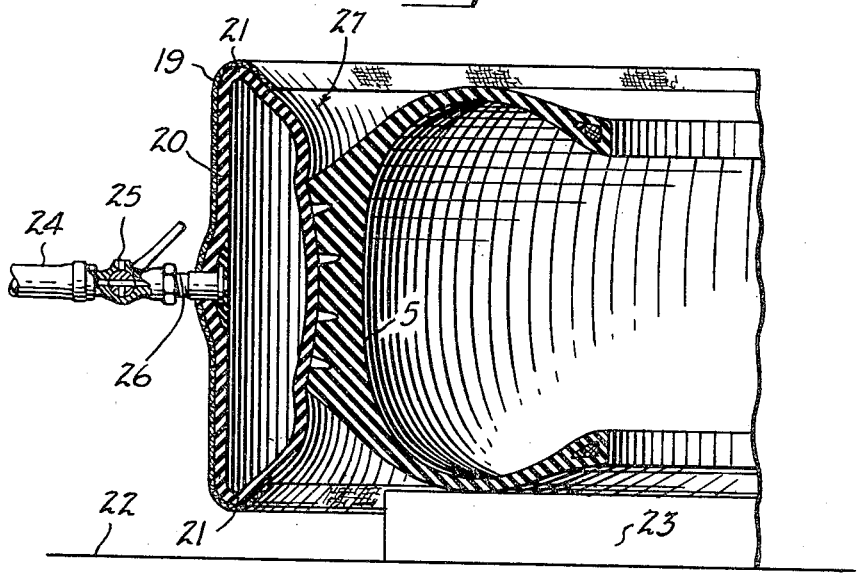
Fig. 5 is a cross-sectional view of the spreader of Fig. 4 with the membrane inflated.

Figs. 4 and 5 show another form of spreader in which the constricting means comprises an outwardly substantially inextensible member such as a fabric ring or sleeve 19 surrounding an inwardly inflatable constricting member such as an annnular rubber tube or membrane 20. The edges of the fabric sleeve 19 lap over or extend around the edges 21 of the tube about ¾" or more depending upon the size of the unit and are cemented or otherwise adhered to the tube. In the alternative, the fabric sleeve can be frictioned into the outer circumference of the tube and the assembly cured up in a mold. The fabric sleeve should lap over the edge of the tube enough to control and direct the inward expansion of the tube and maintain adhesion to the tube throughout continued inflations. The fabric sleeve is preferably made of regular square-woven cotton duck fabric with the warp running circumferentially of the tube and the weft axially of the tube. However, square-woven rayon, nylon, or even wire fabric with sufficient strength over the outer circumference of the tube so as to form an inextensible ring and prevent outward expansion of the tube when it is inflated against a pneumatic tire is satisfactory. Generally, the fabric should be at least twice as strong in the warp or circumferential direction as in the weft or axial direction. Of course, fabrics with substantially equal strength in both directions are satisfactory, in which cases there is extra strength in the weft or lateral directions. Strength in the axial or lateral direction is required in order to prevent the tube from expanding laterally instead of inwardly as is apparent. I have found that most bias-cut and weak-weft fabrics are unsatisfactory for this purpose.

The tube 20 is preferably made of tire inner tube rubber composition or an air bag rubber composition of sufficient thickness as is well known in the art. The inner circumference of the tube defines a central core portion 27 free of all incumbrances so as to freely receive pneumatic tires and other annular casings. Obviously, any air valves have to be on the side or outside circumferential portion or surface of the tube so as not to contact or interfere with a pneumatic tire placed therein.

The spreader of Figs. 4 and 5 is preferably mounted horizontally on the floor or ground support 22 and the tube or annular casing 5 to be opened is placed inside the spreader and rests on a supporting block 23 so as to be centered within the spreader. A hose 24 supplies air through valve 25 and valve stem 26 to form air supply and air exhaust means for the tube 21. The spreader operates in substantially the same fashion as the form shown in Figs. 1 to 3.

While the tire is thus open and the beads 18 spread apart, tubes are readily inserted in the tire. This is especially suitable for the insertion of puncture sealing tubes. These tubes have a gum on the interior surface which is sticky and adhesive. Thus the tube must be kept in a semi-inflated condition at all times to prevent the opposite sides from sticking together and must be inserted in the tire casing in a semi-inflated condition. The subject spreader provides clear and easy insertion of such a tube and no obstruction of any kind across the tire beads. Likewise an inspection of the side walls and inside of the tire is easily made. The subject spreader is also used to set the beads of "tubeless" tires firmly against the rim so that the tire can be inflated.

This application is a continuation-in-part of my application Serial No. 293,459 filed June 13, 1952, now abandoned.

It is to be understood that in accordance with the provisions of the patent statutes, variations and modifications of the specific invention herein shown and described may be made without departing from the spirit of the invention.

What I claim is:

1. A spreader for annular casings comprising a rigid ring of a diameter greater than the diameter of the casing, a fabric reinforced, flexible, air-tight membrane mounted on the inner surface of said ring and sealed to said ring to provide an annular air-tight cavity intermediate said membrane and the inner surface of said ring, and air supply and air exhaust means for said cavity, said membrane defining a central core portion free of all incumbrances which is adapted to freely receive annular casings.

2. A spreader for pneumatic tire casings comprising a rigid ring with an inside diameter from ½ to 2 inches greater than the diameter of the casings and with a central core portion adapted to receive the casings, a flexible, air-tight membrane mounted on the inner surface of said ring to form an air-tight, annular cavity intermediate the inner surface of said ring and the membrane, and means to inflate and deflate said cavity so as to apply fluid pressure about the periphery of a casing disposed in the central core portion of said ring.

3. A spreader for pneumatic tire casings comprising a rigid backing ring with a diameter somewhat larger than the diameter of the tire casings and with a width greater than the width of the tire casings, a flexible, air-tight membrane mounted on the inner surface of said ring and sealed to said ring to provide an annular air-tight cavity intermediate said membrane and the inner surface of said ring, and air supply and air exhaust means for said cavity.

4. A spreader for pneumatic tire casings comprising a rigid backing ring with a diameter somewhat larger than the diameter of the pneumatic tire casing to be spread, a flexible, air-tight membrane mounted on the inner surface of said ring and sealed to said ring to form an air-tight cavity intermediate said membrane and the inner surface of said ring, air supply and air exhaust means to and from said cavity, said membrane, when inflated, applying fluid pressure to the circumference of the pneumatic tire casing disposed within said backing ring.

5. A spreader for pneumatic tire casings comprising an inextensible backing ring with a diameter somewhat larger than the diameter of the tire casings and with a width greater than the width of the tire casings, a flexible, air-tight membrane mounted on the inner surface of said ring to provide an air-tight cavity intermediate the membrane and the inner surface of said ring, and air supply and air exhaust means on said backing ring for said cavity, said membrane being substantially coextensive in width with said backing ring and, in the deflated condition, having a substantially constant radius across the width thereof.

6. A spreader for pneumatic tire casings comprising a substantilay inextensible fabric backing ring with a diameter somewhat larger than the diameter of the tire casings, a flexible, air-tight rubber tube mounted on the inner surface of said ring to provide an air-tight cavity about the inner surface of said ring, and air supply and air exhaust means for said cavity mounted on the outer half portion of said tube and extending through said fabric backing ring, said tube being substantially coextensive in width with said backing ring and, in the deflated condition, having a substantially constant radius across the width thereof.

7. The spreader of claim 6 in which the fabric backing laps over the edges of the tube and is cemented to the tube.

8. A spreader for pneumatic tire casings comprising a substantially inextensible fabric backing ring with a diameter somewhat larger than the diameter of the tire casings, a flexible, air-tight rubber tube mounted on the inner surface of said ring to provide an air-tight cavity about the inner surface of said ring and air supply and air exhaust means for said cavity on said backing ring, said tube being substantially coextensive in width with said backing ring and, in the deflated condition, having a substantially constant radius across the width thereof so as to freely receive tire casings, the warp threads of the fabric backing ring running at right angles to the width thereof and the weft threads of the fabric backing ring running parallel to the width thereof, the strength of the fabric in the warp direction being at least twice the strength of the fabric in the weft direction.

References Cited in the file of this patent

UNITED STATES PATENTS

| | | |
|---|---|---|
| 1,144,239 | Poole | June 22, 1915 |
| 1,738,504 | Stevens | Dec. 3, 1929 |
| 2,525,114 | Branick | Oct. 10, 1950 |
| 2,589,771 | Campbell et al. | Mar. 18, 1952 |
| 2,605,200 | Iknayan | July 29, 1952 |